United States Patent

Yasukawa

[11] Patent Number: 5,836,262
[45] Date of Patent: Nov. 17, 1998

[54] ANIMAL EXCRETION TREATING MATERIAL AND METHOD OF MANUFACTURING SAME

[75] Inventor: Yoichi Yasukawa, Tokyo, Japan

[73] Assignee: Y. Yasukawa, Tokyo, Japan

[21] Appl. No.: 849,910

[22] PCT Filed: Oct. 20, 1995

[86] PCT No.: PCT/JP95/02165

§ 371 Date: Aug. 13, 1997

§ 102(e) Date: Aug. 13, 1997

[87] PCT Pub. No.: WO97/14299

PCT Pub. Date: Apr. 24, 1997

[51] Int. Cl.$^6$ .................................................. A01K 1/015
[52] U.S. Cl. ............................................................ 119/173
[58] Field of Search ...................................... 119/171, 173

[56] References Cited

U.S. PATENT DOCUMENTS

| | | | |
|---|---|---|---|
| 3,921,581 | 11/1975 | Brewer | 119/173 |
| 5,542,374 | 8/1996 | Palmer, Jr. | 119/173 |

FOREIGN PATENT DOCUMENTS

| | | | |
|---|---|---|---|
| 61-74527 | 4/1986 | Japan | 119/173 |
| 3-46089 | 7/1991 | Japan . | |
| 4-99424 | 3/1992 | Japan . | |
| 5-260873 | 10/1993 | Japan . | |
| 7-67490 | 3/1995 | Japan . | |
| 7-203793 | 8/1995 | Japan . | |

*Primary Examiner*—Robert P. Swiatek
*Attorney, Agent, or Firm*—Kenyon & Kenyon

[57] ABSTRACT

An animal excretion treating material is a granulated product of a mixture comprising 49 to 59% by weight of a powdered natural organic substance having a particle size of 60 mesh or less, 20 to 30% by weight of powdered bentonite having a particle size of 200 mesh or less, 6 to 16% by weight of a powdered highly water-absorbable resin, and 5 to 15% by weight of a powdered binder. The granulated product having a bulk density of 0.25 to 0.5 g/cm$^3$ and a water-absorbing ability of 1.3 to 3 times its own weight. Thus, the animal excretion treating material is combustible and can be burnt up, and particles of the animal excretion treating material are coagulated and discarded in a smaller amount in one excretion.

4 Claims, No Drawings

ANIMAL EXCRETION TREATING MATERIAL AND METHOD OF MANUFACTURING SAME

FIELD OF THE INVENTION

The present invention relates to a material for treating an excretion from an animal such as livestock and pets, and a process for producing the same. Particularly, the present invention relates to a cat sand for treating an excretion from a cat and a process for producing the same.

BACKGROUND ART

An animal excretion treating material such as a cat sand is used for excretion of a livestock and a pet such as cat. Granules such as sand, zeolite, bentonite or pulp are used as such animal excretion treating material used for the excretion provided by the pet. However, these animal excretion treating materials are insufficient in water-absorbing function as an excretion treating material. For this reason, granules such as a blend produced by mixing sand, pulp, bentonite or the like into a chemically-untreated natural organic substance such as grass, chaff, orange peel, peanut hull, peat moss and wood flour, and further mixing a highly water-absorbable resin and a binder to the resulting mixture, have been used as an animal excretion treating material (see Japanese Patent Publication No. 3-46089).

Each of these animal excretion treating materials is used to treat an excretion such as urine from a livestock or a pet by absorption. However, the absorbed excretion permeates an excretion treating material layer and hence, the excretion is spread. It is impossible to discard the excretion-absorbed material portion at every time. Thereupon, the animal excretion treating material is used until the entire material absorbs the excretion, but there is a problem that a urine odor is generated. In this respect, bentonite particles are wet by urine or the like to adhere to one another and hence, the mass of the particles adhered to one another by urine can be discarded at every time of excretion. Therefore, the bentonite particles have been used relatively by preference.

However, the bentonite particles are not combustible and hence, it is difficult to burn up the bentonite particles. In addition, the amount of bentonite particles discarded at one excretion is large, and even in this respect, the bentonite particles are accompanied by a problem.

The present invention aims for solving the problems concerning the generation of the urine odor and the discarding of the conventional animal excretion treating material.

DISCLOSURE OF THE INVENTION

Accordingly, it is an object of the present invention to provide an animal excretion treating material, which is combustible and can be burnt up after being used, and the particles are consumed in a smaller amount for a mass produced from the adhesion to one another at one excretion.

To achieve the above object, according to the present invention, there is provided an animal excretion treating material which is a granulated product of a mixture comprising 49 to 59% by weight of a powdered natural organic substance having a particle size of 60 mesh or less, 20 to 30% by weight of powdered bentonite having a particle size of 200 mesh or less, 6 to 16% by weight of a powdered highly water-absorbable resin, and 5 to 15% by weight of a powdered binder, the granulated product having a bulk density of 0.25 to 0.5 g/cm$^3$ and a water absorbing ability of 1.3 to 3 times its own weight.

In addition, according to the present invention, there is provided a process for producing an animal excretion treating material, comprising the steps of uniformly mixing, at a rotational speed of 600 rpm, 49 to 59% by weight of a powdered natural organic substance having a particle size of 60 mesh or less, 20 to 30% by weight of powdered bentonite having a particle size of 200 mesh or less, 6 to 16% by weight of a powdered highly water-absorbable resin, and 5 to 15% by weight of a powdered paste, granulating and drying the resulting mixture to provide a granulated and dried product which has a bulk density of 0.25 to 0.5 g/cm$^3$ and a water-absorbing ability of 1.3 to 3 times its own weight.

The term "mesh" used in this specification means a mesh in Tyler standard sieve.

In the animal excretion treating material, the amount of the animal excretion treating material used for forming a mass formed by adhesion of the particles to one another by 20 ml of a 1% solution of salt is as small as about 6 to 16 g and about 10 g on an average. To achieve such a performance, the animal excretion treating material according to the present invention is formed from the powdered natural organic substance, preferably, wood flour, the bentonite, the highly water-absorbable resin and the powdered binder.

According to the present invention, to uniformly mix these components, 49 to 59% by weight of the natural organic substance such as wood flour is mixed, but it is required that the natural organic substance is pulverized into particles, 98% or more of which is smaller than the opening of sieve of 60 mesh (the opening of sieve: 0.246 mm). It is required that the bentonite powder blended in the amount of 20 to 30% by weight is pulverized into particles, 90% or more of which is smaller than the opening of sieve: of 200 mesh (the opening of sieve: 0.074 mm). According to the present invention, to increase the water-absorbency, 6 to 16% by weight of the highly water-absorbable resin is mixed. The highly water absorbable resin used in the present invention is a general term of a group of resins capable of being maintained solid, even if it absorbs water in an amount which is 30 to 2,000 times its own weight. Specific examples of the highly water-absorbable resins are a saponification product of a copolymer of vinyl ester and an ethylene-based unsaturated carboxylic acid or the derivative thereof, a starch/acrylic acid graft copolymer, a cross-linked product of polyacrylic acid, a vinyl alcohol/acrylic acid copolymer, a partially hydrolyzed product of a polyacrylonitrile, a cross-linked product of a carboxyl-methyl-cellulose, a cross-linked product of polyethylene glycol, a salt of chitosan, a pullran gell and the like. Especially, when a highly water-absorbable resin is produced, if carboxylic groups (—COOH) are contained in a polymer, then it is preferable that the carboxylic groups are not completely neutralized with an alkali to leave some of the carboxyl groups, so that they are reacted with ammonia in urine, thereby providing an enhanced deodorizing effect.

According to the present invention, a powdered highly water-absorbable resin may be used for the purpose of achieving a uniform mixing.

According to the present invention, preferred binders are those capable of binding the starting particles in the granulated product to one another to solidify them and capable of being disintegrated in water within a short time after being used. Such water-soluble binders include a polyvinyl alcohol (PVA), a carboxyl-methyl-cellulose (CMC), a methyl-cellulose (MC), starch, pullran, gelatin and the like.

Examples of binders dissolved in an alcohol solution for use are a hydroxyl-ethyl-cellulose (HEC), a hydroxyl-propyl-cellulose (HPC), a polyvinyl pryrrolidone (PVP) and the like.

According to the present invention, the animal excretion treating material is formed through mixing and granulating of the components into particles, so that when 20 ml of the 1% solution of salt is injected into one point of the animal excretion treating material, the weight of a mass formed by the adhesion of the particles of the animal excretion treating material to one another is in a range of 26 to 36 g, preferably, 28 to 33 g. If the weight of the mass formed by the adhesion of the particles is equal to or larger than 36 g, the animal excretion treating material is used in an increased amount in one excretion provided by a livestock or a pet and hence, such a weight is not preferred. If the weight of the mass is smaller than 26 g, it is difficult to stably produce the animal excretion treating material and hence, such a weight is not preferred.

According to the present invention, the animal excretion treating material is produced so that it is not easily scattered by a livestock or a pet. Therefore, the bulk density of the animal excretion treating material is preferably in a range of 0.25 to 0.5 g/cm$^3$, and more preferably in a range of 0.3 to 0.4 g/cm$^3$.

According to the present invention, the water-absorbing ability of the animal excretion treating material is preferably in a range of 1.3 to 3.0 times its own weight, more preferably in a range of 1.5 to 2.5 times its own weight, for the purpose of forming the preferred mass.

According to the present invention, metered blend components are first mixed and added thereto with water and then kneaded. It is preferable that these steps are performed using Spartan Ryuser made by Fuji Powder Co. The Spartan Ryuser is generally of a horizontal type and includes agitating blades provided at a plurality of stages on a rotary shaft inserted through the inside of a vessel having a water-adding nozzle, and a bottomed entirely-porous cylindrical frame including a scraper blade rotatably provided in the form of a cage having coarse openings within the vessel and outside a locus of rotation of the agitating blades.

The mixing, water-adding and kneading steps in the present invention are carried out in a batch-wise. These operations are carried out by rotating the inner rotary blades at 600 rpm or more, preferably at 1,000 rpm and rotating the outer cylindrical frame in the opposite direction at 16 rpm. After mixing for a given period of time, the water-addition is carried out by adding water in an amount of 28 to 32% by weight based on the mixture. Particles having different specific gravities and different particle sizes are uniformly mixed by such a high-speed rotation, and the resulting mixture is supplied to the subsequent granulating step. The granulating step can be performed by an extruding granulator such as a roll-type disk extruding granulator. Bores of granulating die are formed into a diameter of 3.5 to 5.6 mm.

According to the present invention, the granulated product formed by the extruding granulator is columnar, but is not preferred as an article, because particles having a length of 10 to 50 mm are present in the granulated product. Therefore, the granulated product is subjected to a sizing into a size of 5.5 or less in a pulverizing sizer. The pulverizing sizer is constructed into a vertical type including a bored cylindrical vessel having a large number of bores provided in a cylindrical wall, and a cutter provided with in the cylindric al vessel and having rotatable blades at multiple stages on a rotary shaft extending in a direction toward a center axis of the cylindrical vessel. The granulated product to be pulverized is supplied from the above into the cylindrical vessel of the pulverizing sizer in a direction of extension of the center axis.

BEST MODE FOR CARRYING OUT THE INVENTION

The present invention will now be described by way of embodiments, but the present invention is not limited in anyway to the following description and illustration.

EXAMPLE 1

54 Parts by weight of sawdust having a bulk specific gravity of 0.2 and a particle size of 60 mesh in 98% of the sawdust, 11 parts by weight of a highly water-absorbable resin (aquamate AQ800 made by Sekisui Kaseihin Industries, Co., Corp) partially substituted by sodium ion and having a particle side of 200 mesh or less in 90% of the resin, and 10 parts by weight of carboxyl-methyl-cellulose (Cellogen-PR made by Daiitchi Seiyaku KK) were metered and placed into the mixing vessel of the Spartan Ryuser RM0500 (made by Fuji Powder Co.). The mixing vessel was closed by a lid to start the mixing. The mixing was carried out by rotating the rotary shaft at 1,000 rpm and rotating the bored cylindrical frame in the opposite direction at 16 rpm. After mixing for one minute, 20 parts by weight of water was added while being sprayed for one minute, while continuing the mixing. After spraying addition of water, the mixture was kneaded for 2 minutes. The mixture resulting from the kneading was in a uniformly mixed state and was supplied to Disk Pelleter RV60 (made by Fuji Powder, Co.) of a roll type disk extruding granulator with a die having a bore zide of 4 mm and a thickness of 4 mm. The mixture uniformly kneaded and supplied to the Disk Pelleter was granulated by passing through the bores in the die with the roller rotated thereon. The granulates have a diameter of 4 mm. Particles having a length of 10 to 50 mm were present in the granulates and hence, the granulates were supplied to and pulverized in the bored cylindrical vessel in a flash mill of the pulverizing sizer. The pulverized granulates were dried by a fluidized bed drier into which hot air having a temperature 110° to 120° C. is blown.

10 Grams of a sample of the cat sand produced in the above manner were dried for 2 hours at a constant temperature of 110° C., and a decrement % was determined and defined as water. The sample of the cat sand was placed into a 500 ml test tube until it reached a graduation of 500 ml, and the weight of the placed sample was determined and then divided by the volume value of 500 ml to determine a bulk specific gravity value. These results are given in Table 1.

TABLE 1

| Name of sample | Water % | Bulk specific gravity |
| --- | --- | --- |
| 1 | 5.3 | 0.35 |
| 2 | 5.7 | 0.35 |
| 3 | 5.0 | 0.34 |

The cat sand produced in the above-described embodiment was subjected to a particle size analysis. In the particle size analysis, 500 g of a sample resulting from the reduction of a portion of the product by use of sampler was screened by sieves having openings of 4 mm, 2.83 mm, 1.68 mm and 1 mm. Weight of oversize particles as to a sieve of 4 mm mesh, intermediate-size particles between sieves of 4 mm mesh and 2.83 mm mesh, intermediate-size particles between sieves of 1.68 mm mesh and 1 mm mesh and undersize particles as to a sieve of 1 mm mesh were determined and represented by percentage respectively. The results were are given in Table 2.

TABLE 2

| Particle diameter | Weight % |
|---|---|
| +4.0 mm | 18.8 |
| 4.0 mm–2.83 mm | 34.9 |
| 2.83 mm–1.68 mm | 32.9 |
| 1.68 mm–1.00 mm | 11.7 |
| –1.0 mm | 1.7 |

The cat sand produced in the above-described embodiment was laid, and 20 ml of salt solution containing 9 g of salt dissolved in 1 liter of water was injected to a central portion of the cat sand laid and as a result, particles were adhered to one another to form a mass. The weight of this mass was measured. As was the cat sand in the Example, 20 ml of the salt solution was injected to each of a commercially available bentonite cat sand as a comparative example 1 and a cat sand formed of hardenable paper sand as a comparative example 2 to form a mass, and the weight of the mass was measured. The results are given along with the bulk specific gravity in Table 3 below.

TABLE 3

| Name of sample | Bulk specific gravity | Weight (g) of mass formed by 1% salt solution |
|---|---|---|
| 1 | 0.35 | 28.8 |
| 2 | 0.35 | 30.1 |
| 3 | 0.34 | 29.3 |
| Comparative example 1 | 1.0 | 70.0 |
| Comparative example 2 | 0.5 | 45.0 |

In Table 3, it was found that any of the masses formed from the cat sands of the comparative examples 1 and 2 had a volume of 50 ml or more, but the mass formed from the cat sand produced in the example had a volume on the order of 27 ml, which was substantially half of the volumes of the masses in the comparative examples 1 and 2, and the cat sand produced in the Example was not bulky even after being used.

Industrial Applicability

The animal excretion treating material according to the present invention is light in weight, and can be easily carried about, as compared with the prior art animal excretion treating material, because it is formed by mixing the highly water-absorbable resin and the bentonite and binding their particles with the binder in order to enhance the water-absorbing ability. In addition, the animal excretion treating material according to the present invention can be used in a small amount to easily absorb an excretion from a livestock or a pet, whereby the particles can be adhered to one another to form the mass wrapping the excretion therein. Moreover, the mass formed in the above manner is small and not bulky, as compared with the mass formed from the prior art cat sand. Most of the animal excretion treating material according to the present invention is formed of the combustible organic substance. Therefore, the animal excretion treating material according to the present invention can be burnt up and crudely decomposed as it is, so that the disposal, is easily carried out.

What is claimed is:

1. An animal excretion treating material which is a granulated product of a mixture comprising 49 to 59% by weight of a powdered natural organic substance having a particle size of 60 mesh or less, 20 to 30% by weight of powdered bentonite having a particle size of 200 mesh or less, 6 to 16% by weight of a powdered highly water-absorbable resin, and 5 to 15% by weight of a powdered binder, said granulated product having a bulk density of 0.25 to 0.5 g/cm$^3$ and a water-absorbing ability of 1.3 to 3 times its own weight.

2. An animal excretion treating material according to claim 1, wherein said powdered natural organic substance is wood flour.

3. A process for producing an animal excretion treating material, comprising the steps of uniformly mixing, at a rotational speed of 600 rpm, 49 to 59% by weight of a powdered natural organic substance having a particle size of 60 mesh or less, 20 to 30% by weight of powdered bentonite having a particle size of 200 mesh or less, 6 to 16% by weight of a powdered highly water-absorbable resin, and 5 to 15% by weight of a powdered paste; and granulating and drying the resulting mixture to provide a granulated and dried product which has a bulk density of 0.25 to 0.5 g/cm$^3$ and a water-absorbing ability of 1.3 to 3 times its own weight.

4. A process for producing an animal excretion treating material according to claim 3, wherein said powdered natural organic substance is wood flour.

* * * * *

UNITED STATES PATENT AND TRADEMARK OFFICE
CERTIFICATE OF CORRECTION

PATENT NO. : 5,836,262
DATED : November 17, 1998
INVENTOR(S) : Yoichi Yasukawa

It is certified that error appears in the above-identified patent and that said Letters Patent is hereby corrected as shown below:

Column 1, line 36, change "particles are wet by urine or the like to adhere" to read -particles wet by urine or the like adhere-;

Column 2, line 35, after "sieve" delete - : -;

Column 3, line 62, change "5.5 or" to read - 5.5 mm or -;

Column 3, line 65, change "with in " to read -within -;

Column 3, line 66, change "cylindric al" to read - cylindrical-.

Signed and Sealed this

Sixth Day of February, 2001

Attest:

Attesting Officer

Q. TODD DICKINSON

Director of Patents and Trademarks